United States Patent [19]

Meyer

[11] 3,901,882

[45] Aug. 26, 1975

[54] 3-AMINO CARDENOLIDES AND BUFADIENOLIDES, DERIVATIVES AND SALTS THEREOF

[75] Inventor: Kuno Meyer, Basel, Switzerland

[73] Assignee: Hoffmann-La Roche Inc., Nutley, N.J.

[22] Filed: Oct. 4, 1972

[21] Appl. No.: 295,043

Related U.S. Application Data

[63] Continuation-in-part of Ser. No. 162,030, July 9, 1971, abandoned.

[30] Foreign Application Priority Data

July 24, 1970   Switzerland...................... 11238/70

[52] U.S. Cl.............................. 260/239.57; 424/241
[51] Int. Cl.².......................................... C07J 19/00
[58] Field of Search............................... 260/239.57

Primary Examiner—Elbert L. Roberts
Attorney, Agent, or Firm—Samuel L. Welt; Jon S. Saxe; George M. Gould

[57]   ABSTRACT

3-Amino cardenolides and bufadienolides, derivatives and salts thereof as a new class of cardiac agents.

24 Claims, No Drawings

3-AMINO CARDENOLIDES AND BUFADIENOLIDES, DERIVATIVES AND SALTS THEREOF

RELATED APPLICATIONS

This application is a continuation-in-part of application Ser. No. 162,030, filed July 9, 1971, and now abandoned.

BRIEF DESCRIPTION OF THE INVENTION

The present invention is concerned with a new class of cardioactive cardenolides and bufadienolides. Processes for their preparation are disclosed.

The cardenolides and bufadienolides provided by the present invention are compounds of the general formula

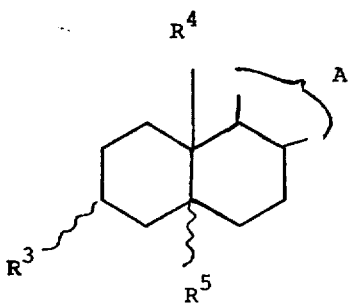

I wherein A is selected from a grouping of the formula $A_1$, $A_2$, $A_3$ or $A_4$

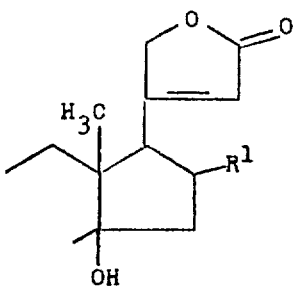

($A_1$)

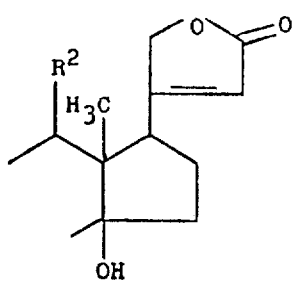

($A_2$)

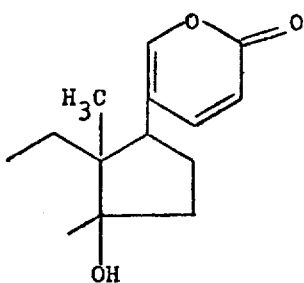

($A_3$)

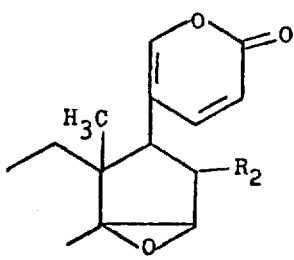

($A_4$)

$R^1$ is hydrogen, hydroxy or acetoxy; $R^2$ is hydroxy or acetoxy; $R^3$ is a primary, secondary or tertiary amino group or a 2-oxo-3-oxazolidinyl or ureido group; $R^4$ is a methyl group or, when A is a group $A_1$ in which $R^1$ is hydrogen, $R^4$ is a methyl, hydroxymethyl, formyl or carboxy group and $R^5$ is β-hydroxy when $R^4$ is a hydroxymethyl, formyl or carboxy group or an α- or β-hydrogen atom when $R^4$ is a methyl group and A is a grouping $A_1$ in which $R^1$ is hydrogen, and a β-hydrogen atom at all other times, acid addition salts and quaternary ammonium salts thereof.

As used in this description and in the accompanying claims, the term "secondary amino group" preferably means a $C_{1-6}$ alkylamino group such as methylamino, ethylamino, propylamino and isopropylamino, the β-hydroxyethylamino group or a $C_{1-6}$ alkanoylamino group such as acetylamino and propionylamino. Examples of tertiary amino groups are di-($C_{1-6}$ alkyl)-amino groups such as dimethylamino and diethylamino: di-($C_{1-6}$ alkanoyl)-amino groups such as diacetylamino: N-$C_{1-6}$ alkyl-N-$C_1$-$C_6$-alkanoylamino groups such as N-methyl-N-acetylamino or N-ethyl-N-acetylamino; N-β-hydroxyethyl-N-$C_{1-6}$alkanoylamino groups such as N-2-hydroxyethyl-N-acetylamino: N-($C_1$-$C_6$ alkanoyloxyalkyl)-N-$C_1$-$C_6$-alkanoylamino groups such as (acetoxyethyl) acetylamino; dihydroxyethylamino; di-$C_{1-6}$-alkanoyloxymethylamino, such as diacetoxymethylamino as well as cyclic groups such as pyrrolidino, piperidino and morpholino. 1

The preferred compounds of formula I are those in which the substituent in the 3-position has the β-configuration.

The term "salt" as used herein is meant to include the acid addition salts and quaternary ammonium salts, particularly the pharmaceutically acceptable acid addition salts. Pharmaceutically acceptable acid addition salts include organic acids such as oxalic acid, citric acid, acetic acid, lactic acid, maleic acid, tartaric acid or the like; or inorganic acids such as the mineral acids, e.g., hydrochloric acid, hydrobromic acid, sulfuric acid or the like. Quaternary ammonium salts include salts formed with lower alkyl halogenides, such as the methoiodides and ethoiodides. Non-pharmaceutically acceptable acid addition salts may be converted to pharmaceutically acceptable acid addition salts by ion exchange procedures known per se.

Compounds of formula I and their salts may be prepared by the following processes:

a. reducing the group Z in a compound of the general formula

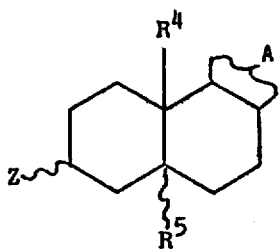

II wherein Z is a hydroxyimino or azido group and A, $R^4$ and $R^5$ are as above,
to the amino group, or b. acylating, methylating, hydroxyethylating or carbamoylating the amino group in a compound of the general formula

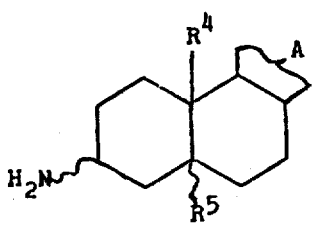

III wherein A, $R^4$ and $R^5$ are as above,
or c. reacting a compound of the general formula

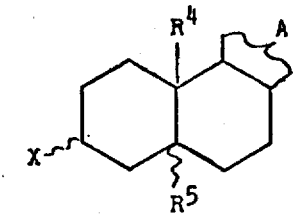

IV wherein X is a bromine atom or a tosyloxy group and A, $R^4$ and $R^5$ are as above,
with a primary or secondary amine, or d. cyclizing the hydroxyethylamino group in a compound of the general formula

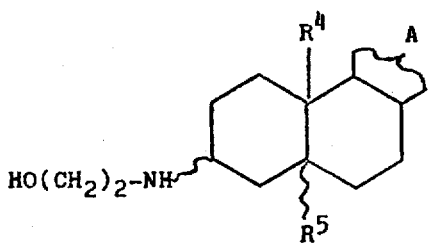

V wherein A, $R^4$ and $R^5$ are as above,
to the oxazolidinone and, if desired, converting the resulting product obtained above into a salt.

Particularly suitable reducing agents for the reduction of a compound of formula II in accordance with process embodiment (a) are aluminum amalgam and hydrogen activated by noble-metal catalysts. When using a aluminum amalgam as the reducing agent, it is expedient to carry out the reduction at room temperature. Suitable reduction media are, for example, aqueous ethanol and mixtures of dioxan, ethanol and water. A preferred noble-metal catalyst is palladium, especially palladium on a carrier such as calcium carbonate or charcoal.

The acylation, methylation, hydroxyethylation or carbamoylation of the amino group in a compound of the formula III in accordance with process embodiment (b) can be effected as follows: The acylation can, for example, be effected by reaction with a reactive acyl derivative, for example an acyl anhydride or acyl halide, in the presence of a base such as pyridine or an alkali hydroxide or alkali carbonate. The methylation is expediently effected by treatment with formaldehyde followed by catalytic hydrogenation. The hydroxyethylation can be carried out by reaction with ethylene oxide. The carbamoylation can, for example, be carried out by reaction with isocyanate or by treatment with phosgene and, subsequently, with ammonia.

The reaction of a compound of formula IV with a primary or secondary amine in accordance with process embodiment (c) proceeds with inversion of the configuration, i.e. the substituted $3\beta$-amino compound is obtained from a $3\alpha$-tosylate. This reaction can be carried out in a manner known per se if desired in the presence of an organic or inorganic base such as pyridine or an alkali hydroxide or alkali carbonate.

The hydroxyethylamino group in a compound of formula V can be cyclized to a 2-oxo-3-oxazolidinyl group in accordance with process embodiment (d) by treatment with phosgene.

The cardenolides and bufadienolides of formula I provided by the present invention are useful as cardiac agents. For example, they possess positive inotropic activity on the muscles of the heart. The latent time, as well as the duration of action, are shorter than with cardiac glycocides used clinically. A useful human adult daily dosage is in the range of 2–20 mg. per day taken orally and 0.2–2 mg per day taken parenterially, preferably intraveneously, although higher or lower dosages may also be employed based on the condition of the patient and the objectives of the administrator of the drug. In animal experiments, with for example the compound $3\beta$-[(2-hydroxyethyl)-amino]-14-hydroxy-$5\beta,14\beta$-card-20(22)-enolide at a concentration of $3.10^{-6}$ g/l, the contraction force of the guinea-pig auricle could be increased by 50%. The Hatcher dosage for this compound amounts to 1.5 mg/kg. In intravenous doses of from 0.1 mg/kg in the cat, the rate of contraction of the left-hand heart chamber increases by 50–200% without substantial alteration of the cardiac frequency, the pressure in the right-hand auricle simultaneously falling by 1–1.5 cm $H_2O$.

The compounds of formula I of the present invention can be used as medicaments; for example, in the form of pharmaceutical preparations which contain them in association with a compatible pharmaceutical carrier. This carrier can be an organic or inorganic inert carrier material which is suitable for enteral or parenteral application such as, for example, water, gelatin, gum arabic, lactose, starches, magnesium stearate, talc, vegetable oils, polyalkylene glycols, etc. The pharmaceutical preparations can be made up in solid form (e.g. as tablets, dragees, suppositories or capsules) or in liquid form (e.g. as solutions, suspensions or emulsions). The pharmaceutical preparations may be sterilized and/or may contain additives such as preserving, stabilizing, wetting or emulsifying agents, salts for varying the osmotic pressure or buffers. They can also contain other therapeutically valuable substances.

Suitable enteral dosage forms can contain from 1 to 10 mg., while suitable parenteral dosage forms can contain from 0.1 to 1 mg. of a compound of formula I or an adjusted amount of a pharmaceutically acceptable acid addition salt thereof.

The following examples illustrate the process provided by the invention.

EXAMPLE 1 a. 450 mg. of digitoxigenone are shaken for 30 minutes at 22° with 450 mg. of hydroxylamine hydrochloride, 900 mg. of sodium acetate and 45 ml. of 96% ethanol. The reaction mixture is then treated with 250 ml. of chloroform and successively washed three times with 50 ml. of 0.5N hydrochloric acid each time, 50 ml. of 10% potassium hydrogen carbonate solution and twice with 50 ml. of water. The aqueous phases are extracted a further twice with 100 ml. of chloroform-ethanol (9:1) each time. The combined chloroform-ethanol solutions are dried over sodium sulfate and concentrated in vacuum. The crude product (474 mg.) obtained as the residue is chromatographed on 250 g. of silica gel with chloroform which contains 7% isopropanol. 12 ml. fractions are collected. Fractions 55–69 yield 240 mg. of crude digitoxigenone oxime A. Fractions 70–80 yield 57 mg. of a mixture of digitoxigenone oxime A and B. Fractions 81–98 yield 150 mg. of digitoxigenone oxime B. After recrystallization from methanol-ether-n-pentane, from the crude digitoxigenone oxime A there are obtained 115 mg. of hexagonal leaflets of melting point 178°–182° which after prolonged storage display a melting point of 234°–238°; $[\alpha]_D^{25} = +39.8°$ (chloroform). In the thinlayer chromatogram, this product still shows a content of about 2% of the oxime B. Digitoxigenone oxime B is amorphous.

b. 1.5 g. of sodium acetate are ground with 1.2 g. of hydroxylamine hydrochloride, treated with 20 ml. of methanol and filtered. The filtrate obtained is added to a solution of 2 g. of digitoxigenone in 20 ml. of methanol and heated to reflux for an hour. The methanol is evaporated off in vacuum, the residue obtained taken up in water and chloroform-ethanol (4:1) and the aqueous phase again extracted with chloroform-ethanol. The combined organic solutions are washed with water, dried over sodium sulfate, filtered and evaporated. There are obtained 2.04 g. of crude oxime mixture which is dissolved in acetone, treated with ether and seeded with oxime A, there crystallizing 445 mg. of digitoxigenone oxime A of melting point 234°–238°. This product is thin-layer chromatographically pure.

c. 200 mg. of the mixture of digitoxigenone oxime A and digitoxigenone oxime B obtained as hereinbefore are dissolved in 2.5 ml. of dioxan and 6 ml. of ethanol and thereafter treated with 3.5 ml. of water and 0.5 ml. of 10% ammonia as well as with 100 mg. of crystalline ammonium chloride. To the clear solution there is added aluminum amalgam which is freshly manufactured as follows: 2 g. of aluminum turnings are covered with 10% caustic soda and heated on the steam-bath for 3 minutes, there occurring strong hydrogen-evolution. The caustic soda is poured off, the corroded aluminum washed four times with water and finally once with ethanol, thereafter allowed to stand for 15 seconds with 2% $HgCl_2$ solution, immediately washed three times with water and once with ethanol. The reaction mixture is then allowed to stand at 20° and the course of the reduction is followed in the thin-layer chromatograph [developing agent chloroform-ethanol (10:1)]. No more oxime is detectable after 2–3 days. The reaction solution is thereupon separated off from the amalgam, the amalgam is repeatedly washed with ethanol and the combined solutions are evaporated in vacuum. The residue is evaporated twice with chloroform and once with methanol. The residue thus obtained is treated with acetone. After evaporation, the acetone solution yields 50 mg. of 3α-amino-14-hydroxy-5β,14β-card-20(22)-enolide hydrochloride. The residue which is insoluble in acetone (150 mg.) is taken up in dry hot ethanol and yields 113 mg. of 3β-amino-14-hydroxy-5β,14β-card-20(22)-enolide hydrochloride; melting point 277°–287° (dec.): $[\alpha]_D^{25} = +10°$ (in water).

EXAMPLE 2

50 mg. of 3β-amino-14-hydroxy-5β,14β-card-20(22)-enolide hydrochloride are dissolved in 1 ml. of dry pyridine, the solution is treated with 0.5 ml. of acetic anhydride and allowed to stand at 20° for 16 hours. The reaction mixture is thereafter treated with water and chloroform, the chloroform phase is successively washed with dilute hydrochloric acid, dilute soda solution and water, dried over sodium sulfate, filtered and evaporated. After recrystallization from acetone, the residue yields 37 mg. of 3β-acetamido-14-hydroxy-5β,14β-card-20(22)-enolide, prisms of melting point 281°–287° (dec.); $[\alpha]_D^{25}$ +22° (in chloroform).

EXAMPLE 3

150 mg. of the crude 3α-amino-14-hydroxy-5β,14β-card-20(22)-enolide hydrochloride in the form of the residue insoluble in acetone which is obtained in accordance with Example 1, paragraph (c) are dissolved in 1 ml. of pyridine and 0.5 ml. of acetic anhydride and allowed to stand at 20° for 16 hours. The crude acetylation product is chromatographed on 100 g. of silica gel with chloroform-ethanol (20:1) as eluting agent. 15 ml. fractions are collected. Fractions 48-52 yield 35 mg. of crude 3β-acetamido-14-hydroxy-5β,14β-card-20(22)-enolide. Fractions 56-60 contain 30 mg. of crude 3α-acetamido-14-hydroxy-5β,14β-card-20(22)enolide which is thin-layer chromatographically uniform. Melting point 156°–177° and 253°–257° (from acetone-ethanol after vacuum drying).

EXAMPLE 4

529 mg. of crude digitoxigenone oxime mixture obtained in accordance with Example 1 paragraph b) are dissolved in 50 ml. of 95% ethanol and treated with aluminum amalgam which is freshly prepared as described above from 1.1 g. of aluminum turnings. The reaction mixture is shaken at 20° for 3 days (a further 2.5 ml. of water are added after 2 days). The reaction mixture is extracted in several portions with a total of 200 ml. of chloroform-ethanol (5:1). The organic phases are filtered clear over a filter aid, dried over sodium sulfate, filtered and evaporated. As residue there are obtained 476 mg. of colorless foam which is dissolved in 5 ml. of pyridine, treated with 4 ml. of acetic anhydride and allowed to stand at 20° for 30 minutes. The working up of the reaction mixture yields 540 mg. of crude acetylation product, which crystallized from acetone-ether, yields 41.5 mg. of crystalline 3β-acetamido-14-hydroxy-5β,14β -card-20(22)-enolide. By chromatography of the mother liquor on aluminum oxide (activity II) with benzene/chloroform (4:1 and 3:2) the mixture of 3α- and 3β-acetamido-14-hydroxy-5β,14β-card-20(22)-enolide was separated.

EXAMPLE 5 a. A solution of 1.6 g. of epi-digitoxigenin in 40 ml. of dry pyridine is treated with a solution of 1.5 g. of freshly distilled toluenesulfonyl chloride in 10 ml. of pyridine and allowed to stand at 20° for 15 hours. The reaction mixture is then acidified to pH 4 and repeatedly extracted with chloroform. The chloroform extracts are washed with dilute soda solution and water, dried over sodium sulfate, filtered and evaporated. The crude product thus obtained is chromatographed on 30 g. of silica gel. It is eluted with chloroform/ethanol (99:1) and there are obtained 1.63 g. of 3-toluenesulfonyl-epi-digitoxigenin of melting point 155°–156° (from acetone-ether); $[\alpha]_D^{25} = +35°$ (chloroform).

b. A solution of 500 mg. of 3-toluenesulfonyl-epi-digitoxigenin in 43 ml. of dimethylformamide is treated with 0.7 g. of sodium azide and heated to 75° for 3 hours with exclusion of moisture. The reaction mixture is stirred at 20° for a further 16 hours and thereafter filtered. The filtrate is treated with 27 ml. of water and 17 ml. of chloroform-ethanol (4:1). The organic phase is separated off, the aqueous phase shaken out three times with chloroform-ethanol (4:1). The combined organic extracts are washed with water, dried over sodium sulfate and evaporated in vacuum. Recrystallized from acetone, the residue yields 235 mg. of 3$\beta$-azido-3-desoxydigitoxigenin of melting point 213°–217° $[\alpha]_D^{25} = +22°$ (chloroform).

c. 350 mg. of 3$\beta$-azido-3-desoxy-digitoxigenin are dissolved in 15 ml. of dioxan, 10 ml. of methanol, 5 ml. of water and 2 ml. of 10% ammonium hydroxide, treated with 80 mg. of ammonium chloride and shaken for 17 hours in a hydrogen atmosphere with 2 g. of aluminum amalgam manufactured as described in Example 3. Working up of the reaction mixture in accordance with Example 3 yields 235 mg. of 3$\beta$-amino-14-hydroxy-5$\beta$,14$\beta$-card-20(22)-enolide hydrochloride of melting point 277°–287° (dec.).

EXAMPLE 6

In analogy to Example 5, from 5 g. of digitoxigenin and 3 g. of p-toluenesulfonic acid chloride there are obtained 1.58 g. of 3$\beta$-p-toluenesulfonyl-digitoxigenin of melting point 145°–147°; $[\alpha]_D^{25} = +16°$ (chloroform). The tosylate is converted by reaction with sodium azide into 3$\alpha$-azido-3-desoxy-digitoxigenin, melting point 165°–167°, $[\alpha]_D^{25} = +43°$ (chloroform). The 3$\alpha$-azido compound is reduced with aluminum amalgam and the uncrystallized crude product acetylated as in Example 4. There is obtained 3$\alpha$-acetamido-14-hydroxy-5$\beta$,14$\beta$-card-20(22)-enolide which is identical with the compound obtained in accordance with Example 3.

EXAMPLE 7 a. 7 g. of oleandrigenin are dissolved in 28 ml. of pyridine, cooled to 0° and treated with the cooled solution of 4.7 g. of tosyl chloride in 17.5 ml. of pyridine and allowed to stand at 0° for 4 days. By gradual addition of water and ice and rubbing (or seeding) of the oil which separates out, there may be obtained a crystalline, pulverulent precipitate which is filtered off by suction and, after washing with water, dissolved in chloroform. The chloroform solution is shaken out twice with water which contains a few drops of dilute HCl, once with water, twice with cold saturated KHCO$_3$ solution and subsequently with water. After drying over Na$_2$SO$_4$, filtration and evaporation of the solvent in vacuum, the residue is crystallized from acetone-ether. There are obtained about 8.8 g. of crystalline 16$\beta$-acetoxy-14-hydroxy-3$\beta$-tosyloxy-5$\beta$,14$\beta$-card-20(22)-enolide. Melting point 137°–139°.

b. 7 g. of 16$\beta$-acetoxy-14-hydroxy-3$\beta$-tosyloxy-5$\beta$,14$\beta$-card-20(22)-enolide are dissolved in 100 ml. of dimethylformamide, treated with 6 g. of finely powdered NaN$_3$ and stirred at 20° for 17 hours. The reaction mixture is treated with 200 ml. of water, made weakly acidic with acetic acid and thereupon shaken out three times with 200 ml. of chloroform each time. The chloroform phases are washed twice with 50 ml. of water each time, dried over Na$_2$SO$_4$, filtered and evaporated in vacuum. The difficulty volatile dimethylformamide may be for the most part removed by repeatedly taking up the residue in benzene and driving away the latter in vacuum. There are obtained 2.5 g. of 3$\alpha$-azido-16$\beta$-acetoxy-14-hydroxy-5$\beta$,14$\beta$-card-20(22)-enolide. A further 1.6 g. of product may be obtained from the mother liquor. The pure product melts at 189–190°; $[\alpha]_D^{24} = +3° \pm 2°$ (in chloroform).

c. 500 mg. of 3$\alpha$-azido-16$\beta$-acetoxy-14-hydroxy-5$\beta$,14$\beta$-card-20(22)-enolide are dissolved in 25 ml. of ethanol and 10 ml. of water and, after the addition of 250 mg. of 5% Pd/CaCO$_3$ hydrogenated at 20° for 1½ hours. After filtering off the catalyst, the mixture is evaporated in vacuum, the residue taken up with dilute HCl and a little water (pH about 3), the acidic solution extracted three times with 30 ml. of chloroform each time. The acidic aqueous solution is made alkaline with dilute NH$_3$ solution and extracted three times with 30 ml. of chloroform each time. The extracts are washed with a little water, dried over Na$_2$SO$_4$, filtered and evaporated in vacuum. The residue, 460 mg. of crude amine, is dissolved in 2 ml. of dry chloroform and treated with such an amount of chloroform saturated with dry HCl gas at 20° until the solution reacts slightly acidically (pH about 5). Precipitated hydrochloride is filtered off, washed with chloroform and re-dissolved from methanol-ether. There are obtained 285 mg. of 3$\alpha$-amino-16$\beta$-acetoxy-14-hydroxy-5$\beta$,14$\beta$-card-20(22)-enolide hydrochloride. $[\alpha]_D^{24} = +4° \pm 2°$ (in methanol); $\lambda_{max}$ 214 nm.

EXAMPLE 8

1050 mg. of 3$\alpha$-amino-16$\beta$-acetoxy-14-hydroxy-5$\beta$,14$\beta$-card-20(22)-enolide hydrochloride are dissolved in 10 ml. of pyridine, 7 ml. of acetic anhydride are added and the mixture is allowed to stand at 22° for 30 minutes. It is thereupon treated with water, allowed to stand for a further 30 minutes and evaporated to dryness in vacuum with repeated addition of benzene. The crude product is purified by chromatography on 30 g. of SiO$_2$. With chloroform-methanol (99:1) there may be eluted 1.1 g. of 3$\alpha$-acetylamino-16$\beta$-acetoxy-14-hydroxy-5$\beta$,14$\beta$-card-20(22)-enolide. Melting point 240°–243°. $\lambda_{max.} = 214$ nm, $[\alpha]_D^{24} = +27°$ 2° (in chloroform).

EXAMPLE 9 a. 9 g. of crude 3-epi-oleandrigenin are dissolved in 200 ml. of pyridine, treated with 8 g. of tosyl chloride in 30 ml. of pyridine and allowed to stand at +3°. After 20 hours, the reaction mixture is taken up in 400 ml. of chloroform-ether (1:3) and shaken in the separating funnel with ice and dilute HCl until all pyridine is removed. The organic solution is washed neutral with water, dried over Na$_2$SO$_4$, filtered and evaporated in vacuum. After recrystallization from acetone-ether, there is obtained 16$\beta$-acetoxy-14-hydroxy-3$\alpha$-tosyloxy-5$\beta$,14$\beta$-card-20(22)-enolide. Melting point 154°–156°.

b. 9.45 g. of 16β-acetoxy-14-hydroxy-3α-tosyloxy-5β,14β-card-20(22)enolide are dissolved in 300 ml. of dimethylformamide. 20 g. of finely powdered NaN₃ are added and the mixture is heated with stirring to 50°. After 5 hours, it is filtered, the filtrate treated with 200 ml. of water, neutralized with acetic acid and extracted with chloroform. Working up of the extract yields 9.24 g. of crude azide which is chromatographed on 700 g. of SiO₂. 1.5 ml. fractions are collected. Fractions 70–90 yield 2.10 g. of 16β-acetoxy-3β-azido-14-hydroxy-5β,14β-card-20(22)-enolide, melting point 182°–183°; $[\alpha]_D^{23} = -6° \pm 2°$ (in chloroform).

c. 1 g. of 16-β-acetoxy-3β-azido-14-hydroxy-5β,14β-card-20(22)-enolide are dissolved in 50 ml. of ethanol and 12 ml. of dioxan, a solution of 125 mg. of NH₄Cl in 5 ml. of water is added and the mixture is treated with 6 g. of freshly amalgamated aluminum turnings. (6 g. of aluminum turnings are directly overlaid with 40 ml. of 10% NaOH. As soon as after brief heating a strong H₂-evolution commences, the mixture is poured off from the NaOH. The turnings are repeatedly carefully washed with distilled water and finally with pure ethanol. 40 ml. of HgCl₂ solution (2%) are thereupon added and the vessel is swirled for 30 seconds. It is thereupon decanted off. The product is immediately repeatedly washed with water). The mixture is allowed to stand at 20° for 4 days. The solution is thereupon poured off from the turnings, the turnings are thoroughly washed with ethanol. The combined solutions are centrifuged, the supernatent solution is removed, the sediment is in each case extracted three times with ethanol. The combined solutions are brought to dryness in vacuum at 20°. The residue is dissolved in 25 ml. of water and such an amount of dilute HCl that the solution reacts just congo-acidically. It is thereupon extracted four times with chloroform. The acidic aqueous solution is made alkaline with dilute NH₃ solution and exhaustively extracted with chloroform. The extracts, washed with a little water, are dried over Na₂SO₄, filtered and evaporated. There thereby crystalizes 16β-acetoxy-3β-amino-14-hydroxy-5β, 14β-card-20(22)-enolide. Melting point 167°–177°. The hydrochloride prepared therefrom displays a UV absorption $\lambda_{max}$ 214 nm. $[\alpha]_D^{24} = = 0° \pm 2°$ (in methanol).

EXAMPLE 10

By treatment of 16β-acetoxy-3β-amino-14-hydroxy-5β,14β-card-20(22)-enolide hydrochloride with acetic anhydride in pyridine and chromatography of the reaction product on SiO₂ with chloroform and chloroform-methanol (99:1), there is obtained 16β-acetoxy-3β-acetylamino-14-hydroxy-5β,14β-card-20(22)-enolide. Melting point 254°–256°, $\lambda_{max}$ 216 nm; $[\alpha]_D^{23} = -10° \pm 2°$ (in chloroform).

EXAMPLE 11 a. 1.05 g. of 3β-azido-16β-acetoxy-14-hydroxy-5β,14β-card-20(22)-enolide are dissolved in 70 ml. of methanol, treated with 2 ml. of 25% NH₃ solution and allowed to stand at 20°. After 45 minutes, the mixture is neutralized with dilute acetic acid and the methanol is evaporated in vacuum. The precipitate which thereby separates out is filtered off and washed with water. 3β-azido-14,16β-dihydroxy-5β,14β-card-20(22)-enolide crystallizes from chloroform/acetone in prismatic platelets (730 mg.) of melting point 227°–229°, $\lambda_{max} = 216$ nm, $[\alpha]_D^{23} = +49° \pm 2°$ (in chloroform).

b. 400 mg. of 3β-azido-14, 16β-dihydroxy-5β,14β-card-20(22)-enolide are dissolved in 75 ml. of methanol and 12 ml. of water, treated with 200 mg. of 5% Pd/CaCO₃ and hydrogenated at 20° under usual conditions for 2 hours. The working up of this hydrogenation batch is effected as described in Example 7, paragraph c). 3β-Amino-14,16β-dihydroxy-5β,14β-card-20(22)-enolide hydrochloride is obtained. $\lambda_{max} = 216$ nm. $[\alpha]_D^{23} = 29° \pm 2°$ (in methanol).

EXAMPLE 12

500 mg. of 3β-amino-14,16β-dihydroxy-5β,14β-card-20(22)-enolide hydrochloride are introduced into 7 ml. of pyridine and 0.3 ml. of acetic anhydride, there resulting within 30 minutes a completely clear solution. The solution is allowed to stand at 20° for 1½ hours. The residue obtained after repeated addition of benzene and evaporation off of the latter in vacuum is taken up in chloroform and dilute HCl. After washing neutral with water, drying over Na₂SO₄, filtration and evaporation, the chloroform phases give 450 mg. of crude product which is chromatographed over 12 g. of SiO₂. Elution with chloroform-methanol and crystallization from chloroform-acetone yields 185 mg. of 3β-acetylamino-14,16β-dihydroxy-5β,14β-card-20(22)-enolide of melting point 239°–240°. $\lambda_{max} = 216$ nm, $[\alpha]_D^{22} = +40° \pm 2°$ (in chloroform).

EXAMPLE 13 a. 400 mg. of 16β-acetoxy-3α-azido-14-hydroxy-5β,14β-card-20(22)-enolide are dissolved in 20 ml. of methanol and treated with a solution of 80 mg. of K₂CO₃ in 4 ml. of water. After 90 minutes, the solution is neutralized with acetic acid, filtered off and the filter residue washed with water. After crystallization from acetone, there is obtained 3α-azido-14, 16β-dihydroxy-5β,14β-card-20(22)-enolide. $\lambda_{max} = 215$ nm; melting point 215°–224°; $[\alpha]_D^{24} = +59° \pm 2°$.

b. 300 mg. of 3α-azido-14,16β-dihydroxy-5β,14β-card-20(22)-enolide are dissolved in 54 ml. of methanol, treated with 4.5 ml. of water (which contains 15 drops of triethylamine) and 150 mg. of 5% Pd/CaCO₃. The mixture is hydrogenated for 1.5 hours. Usual working up yields 3α-amino-14,16β-dihydroxy-5β,14β-card-20(22)-enolide. Melting point 187°–189°. The hydrochloride crystallizes in fine felted small needles. Dec.-m.p. from 270°. $[\alpha]_D^{24} = +52° \pm 2°$ (in methanol).

EXAMPLE 14

320 mg. of 3α-amino-14,16β-dihydroxy-5β,14β-card-20(22)-enolide hydrochloride are dissolved in 4 ml. of pyridine, treated with 0.115 ml. of acetic anhydride and allowed to stand at 20°. After 40 minutes, the mixture is treated with 0.5 ml. of water and evaporated to dryness in vacuum with repeated addition of benzene. The crude product thus obtained is chromatographed on 60 g. SiO₂. With chloroform-ethanol (49:1) and (19:1), there are obtained mixtures of non-polar substances. Further elutions with chloroform-ethanol (19:1) and (23:2) yields 3α-acetamido-14,16β-dihydroxy-5β,14β-card-20(22)-enolide. Melting point 159°–163°, (from methanol-acetone) $\lambda_{max} = 213$ nm. $[\alpha]_D^{24} = +60° \pm 2°$ (in chloroform).

EXAMPLE 15 a. 2.1 g. of 12β-acetoxy-14-hydroxy-3-oxo-5β,14β-card-20(22)-enolide are dissolved in 100 ml. of 80% dioxan, cooled to 0° and treated with 15–20 ml. of 80% dioxan which contains 730 mg. of NaBH$_4$ and stirred at 0° for 20 minutes. The reaction mixture is thereupon treated with 10 ml. of methanol, neutralized with acetic acid and evaporated to a small volume which is extracted three times with 25 ml. of chloroform each time. The extracts are washed twice with 10 ml. of water each time, dried over Na$_2$SO$_4$, filtered and evaporated in vacuum and yield 2.1 g. of crude reduction product. This is chromatographed on 200 g. of SiO$_2$ with chloroform-ethanol (19:1). There is obtained 12-β-acetoxy-3α,14-dihydroxy-5β,14β-card-20(22)-enolide of melting point 200°–203°. (From acetone-ether).

b. 1.2 g. of 12β-acetoxy-3α,14-dihydroxy-5β,14β-card-20(22)-enolide are dissolved in 10 ml. of pyridine and allowed to stand at 20° with 1.2 g. of tosyl chloride for 4 days. 10 ml. of water are then added and the mixture is allowed to stand for 2 days. It is thereupon extracted three times with 20 ml. of chloroform each time. The extracts are washed twice with 2-N HCl and subsequently washed with water, dried over Na$_2$SO$_4$, filtered and evaporated in vacuum and yield 1.5 g. of crude tosylate. This is dissolved in 20 ml. of dimethylformamide, treated with 750 mg. of NaN$_3$ and heated for 2 hours with constant stirring at 70°–80°. It is thereafter treated with 15 ml. of water, immediately extracted three times with 30 ml. of chloroform each time, the extracts washed three times with 15 ml. of water each time, dried over Na$_2$SO$_4$ and evaporated in vacuum. There are obtained 1.6 g. of crude product which is chromatographed on 60 g. of SiO$_2$ with acetic ester-cyclohexane (1:1) and yields 1.0 g. of pure 12β-acetoxy-3β-azido-14-hydroxy-5β,14β-card-20(22)-enolide.

c. 300 mg. of 12β-acetoxy-3β-azido-14-hydroxy-5β,14β-card-20(22)-enolide are dissolved in 50 ml. of ethanol and shaken with 150 mg. of Pd/CaCO$_3$ (5%) for 1½ hours in an H$_2$-atmosphere at 20°. The mixture is thereupon filtered off from the catalyst, the solution evaporated in vacuum, the residue treated with dilute HCl up to a pH of about 3–4 and the acidic solution extracted three times with 20 ml. of chloroform each time. The acidic aqueous solutions are made alkaline with dilute NH$_3$ solution and extracted three times with 20 ml. of chloroform each time. The extract is washed with water, dried over Na$_2$SO$_4$, filtered and evaporated in vacuum and yields 293 mg. of crude product. This is dissolved in 2 ml. of dry chloroform and, with swirling, such an amount of chloroform saturated with dry HCl gas at 20° is added that the solution reacts slightly acidically (pH about 5). The precipitated hydrochloride is filtered off, washed three times with 10 ml. of chloroform each time and crystallized from methanol-ether. There are obtained 270 mg. of 12β-acetoxy-3β-amino-14-hydroxy-5β,14β-card-20(22)-enolide hydrochloride which decomposes at about 300°. $[\alpha]_D^{20}$ = +46.1° ±4° (in methanol).

EXAMPLE 16

100 mg. of 12β-acetoxy-3β-amino-14-hydroxy-5β,14β-card-20(22)-enolide hydrochloride are dissolved in 1 ml. of pyridine, treated with 0.5 ml. of acetic anhydride and allowed to stand at 20° for 30 minutes. Pyridine and acetic anhydride are removed by treating with benzene and evaporating the latter in vacuum (repeated several times). From acetone-ether, the residue gives 3β-acetamido-12β-acetoxy-14-hydroxy-5β,14β-card-20(22)-enolide of melting point 241°–257°; $[\alpha]_D^{20}$ = +53.1° ±3° (in chloroform).

EXAMPLE 17 a. 2 g. of digoxin are dissolved in 10 ml. of pyridine, cooled to −10°, treated at −10° with 3 g. of chloroacetic anhydride, stirred at −10° for 10 minutes and subsequently immediately treated with 20 ml. of water. The reaction mixture is thereupon extracted three times with 30 ml. of chloroform each time. The extracts are washed in turn with 2-N hydrochloric acid until all pyridine has been removed, thereupon briefly shaken with 7 ml. of 10% KHCO$_2$ solution and then washed neutral a further twice with water. After drying of the extracts over Na$_2$SO$_4$, filtration and evaporation in vacuum, the crude acylation product, dissolved in 60 ml. of methanol, 15 ml. of acetone and 15 ml. of dioxan, is treated with 30 ml. of 2-N H$_2$SO$_4$ and boiled under reflux for 35 minutes. 100 ml. of water is thereupon added and the mixture is evaporated in vacuum to around 100 ml. The precipitated crystals are dissolved in chloroform, the solution is washed twice with water, dried over Na$_2$SO$_4$, filtered and evaporated in vacuum. There are obtained 1.1 g. of 12β-chloroacetoxy-3β,14-dihydroxy-5β,14β-card-20(22)-enolide. Melting point 269°–275° (from chloroform-methanol-acetone).

b. by means of chromic acid in acetone/dioxan, 2 g. of 12β-chloroacetoxy-3β,14-dihydroxy-5β,14β-card-20(22)-enolide are dehydrogenated to the 3-ketone. This is dissolved in 63 ml. of methanol, treated with 2 g. of KHCO$_3$ in 40 ml. of water and allowed to stand at 20° for 16 hours. The methanol is thereupon removed in vacuum and the aqueous solution is extracted three times with 40 ml. of chloroform each time. The extracts are washed with 20 ml. of water, dried over Na$_2$SO$_4$, filtered and evaporated in vacuum. There are obtained 1.56 g. of 12β,14-dihydroxy-3-oxo-5β,14β-card-20(22)-enolide which melts at 251°–256° after recrystallization from chloroform-methanol-acetone.

c. 1.4 g. of 12β,14-dihydroxy-3-oxo-5β,14β-card-20(22)-enolide are dissolved in 25 ml. of pyridine, cooled to −10°, treated within 30 minutes with 10 ml. of a 2:1 mixture, cooled to −10°, of 98% formic acid and acetic anhydride and allowed to stand at −10° for 16 hours. The mixture is extracted with chloroform and the extracts are worked up by washing with 2N hydrochloric acid, water and KHCO$_3$ solution. The formyl derivative thus obtained is directly reduced with NaBH$_4$ as described in Example 15 section a) and worked up. The reduction product (1.3 g.) is chromatographed on 200 g. of SiO$_2$ with chloroform-ethanol (10:1). There is obtained 12β-formyloxy-3β,14-dihydroxy-5β,14β-card-20(22)-enolide, melting point 233°–243°.

d. 1.7 g. of 12β-formyloxy-3β,14-dihydroxy-5β,14β-card-20(22)-enolide are dissolved in 20 ml. of pyridine, treated with 1.7 g. of tosyl chloride and allowed to stand at 23° for 4 days. After the addition of 20 ml. of water the mixture is held at 20° for 2 hours and thereupon extracted three times with 20 ml. of chloroform each time. The extracts are washed twice with 2-N HCl and subsequently with 10% KHCO$_3$ solution and water, dried over $Na_2SO_4$, filtered and evaporated in vacuum. The crude tosyl ester (2.6 g.) is chromatographed on 230 g. of $SiO_2$ with acetic ester-cyclohexane (1:1), there being obtained 1.9 g. of tosyl ester in platelets (from acetone-ether) of melting point 152°–154°. The tosyl ester is subjected to azidolysis as described in Example 15, section b). For the saponification of the 12-formyloxy group, the crude azide is dissolved in 30 ml. of methanol and 30 ml. of dioxan and allowed to stand at 20° for 20 hours with the solution of 1.6 g. of $KHCO_3$ in 50 ml. of water. The solvents are removed in vacuum, the precipitated azide filtered off, washed neutral with water and chromatographed on 80 g. of $SiO_2$. Elution with chloroform-ethanol (19:1) yields 3β-azido-12β,14-dihydroxy-5β,14β-card-20(22)-enolide of melting point 245°–249°.

e. 250 mg. of 3β-azido-12β,14-dihydroxy-5β,14β-card-20(22)-enolide are dissolved in 90 ml. of ethanol, treated with 125 mg. of $Pd/CaCO_3$ (5%) and shaken for 2 hours in a $H_2$-atmosphere at 20°. Working up as described in Example 15, section (c) gives 40 mg. of a neutral portion and 200 mg. of crude amine from which the hydrochloride is obtained as stated in Example 15, section (c). The 3β-amino-12β,14-dihydroxy-5β,14β-card-20(22)-enolide hydrochloride melts at 290°–300° (with dec.). $[\alpha]_D^{20} = +23° \pm 3°$ (in methanol).

EXAMPLE 18

300 mg. of 3β-amino-12β,14-dihydroxy-5β,14β-card-20(22)-enolide hydrochloride are dissolved in 3 ml. of pyridine cooled to −10°, treated with 1 ml. of acetic anhydride and allowed to stand at −10° for 20 minutes. 7 ml. of 2-N hydrochloric acid are thereupon added. The mixture is extracted five times with 15 ml. of chloroform-ethanol (4:1) each time. The extracts are washed with 10% $KHCO_3$ solution and thereupon with water, dried over $Na_2SO_4$, filtered and evaporated: 286 mg. of crude product which, from methanol on addition of a little ether, yields pure 3β-acetylamino-12β,14-dihydroxy-5β,14β-card-20(22)-enolide of melting point 296°–300°; $[\alpha]_D^{20} = +21.6 \pm 4°$ (in methanol).

EXAMPLE 19 a. 12-O-acetyldigoxigenin are dissolved in 10 ml. of pyridine, treated with 1.3 g. of tosyl chloride and allowed to stand at 20° for 4 days. The working up is effected as described in Example 15, section (b). The crude tosyl compound is stirred in 7 ml. of dimethylformamide with 500 mg. of $NaN_3$ for 3 hours at 70° and then worked up: 1.48 g. of crude azide which is chromatographed on 80 g. of $SiO_2$ with acetic ester-cyclohexane (3:5). There is obtained 12β-acetoxy-3α-azido-14-hydroxy-5β,14β-card-20(22)-enolide of melting point 222°–224°. (from acetone-ether).

b. 700 mg. of 12β-acetoxy-3α-azido-14-hydroxy-5β,14β-card-20(22)-enolide are dissolved in 33 ml. of methanol, treated with 70 mg. of $K_2CO_3$ in 3.5 ml. of water and allowed to stand at 23° for 75 minutes, thereupon neutralized with acetic acid, evaporated in vacuum, treated with water and extracted three times with chloroform-ethanol (2:1): 660 mg. of crude product. Chromatography on 80 g. of $SiO_2$ with chloroform-ethanol (99:1) gives, besides starting material, 3α-azido-12β,14-dihydroxy5β,14β-card-20(22)-enolide. From acetone platelets of melting point 185°–193°.

c. 160 mg. of 3α-azido-12β,14-dihydroxy-5β,14β-card-20(22)-enolide are dissolved in 27 ml. of ethanol and shaken in a $H_2$-atmosphere with 80 mg. of $Pd/CaCO_3$ (5%) for 2 hours. Working up as described in Example 15, section (c) gives 30 mg. of neutral material and 130 mg. of base which is converted into the hydrochloride. The 3α-amino-12β,14-dihydroxy-5β,14β-card-20(22)-enolide hydrochloride melts at 290°–300° (dec.); $[\alpha]_D^{20} = +22.4° \pm 2°$ (in methanol).

EXAMPLE 20

50 mg. of 3α-amino-12β,14-dihydroxy-5β,14β-card-20(22)-enolide hydrochloride are dissolved in 1.0 ml. of pyridine, treated with 0.5 ml. of acetic anhydride and allowed to stand at −10° for 20 minutes. The 3α-acetamido-12β,14-dihydroxy-5β,14β-card-20(22)-enolide obtained after usual working up is amorphous $[\alpha]_D^{21} = +42.9° \pm 4°$ (in methanol).

EXAMPLE 21 a. 160 mg. of 3α-amino-12β,14-dihydroxy-5β,14β-card-20(22)-enolide hydrochloride are dissolved in 2 ml. of pyridine, treated with 1 ml. of acetic anhydride and allowed to stand at 20° for 16 hours. The crude product obtained after usual working up gives 123 mg. of pure 12β-acetoxy-3α-acetylamino-14-hydroxy-5β,14β-card-20(22)-enolide of melting point 253°–260°.

b. 350 mg. of 12β-acetoxy-3α-azido-14-hydroxy-5β,14β-card-20(22)-enolide are dissolved in 45 ml. of ethanol and shaken in an $H_2$-atmosphere with 175 mg. of $Pd/CaCO_3$ (5%) for 2 hours at 20°. Working up gives 65 mg. of neutral portion and 273 mg. of crude base. The hydrochloride is amorphous. 120 mg. of the crude base are dissolved in 2 ml. of pyridine and 1 ml. of acetic anhydride and allowed to stand at 20° for 20 hours. After usual working up from chloroform-acetone-ether there is obtained 3α-acetamido-12β-acetoxy-14-hydroxy-5β, 14β-card-20(22)-enolide of melting point 253°–260°; $[\alpha]_D^{20} = +96.2° \pm 4°$ (in chloroform).

EXAMPLE 22

900 mg. of freshly prepared 3β-amino-14-hydroxy-5β,14β-card-20(22)-enolide are dissolved in 100 ml. of dry ethanol, treated with 3 g. of paraformaldehyde, 600 mg. of 5% $Pd/CaCO_3$ and 1.25 ml. of acetic acid and shaken in an $H_2$-atmosphere for 22 hours at 20°. The mixture is thereafter filtered off from the catalyst and undissolved paraformaldehyde over a filter packed with kieselguhr and the filtrate evaporated in vacuum. The residue is dissolved in 50 ml. of chloroform and this is shaken out with dilute hydrochloric acid. The acidic aqueous phases are washed with chloroform, made alkaline with ammonia, repeatedly extracted with chloroform, the extract dried over $Na_2SO_4$, filtered and evaporated in vacuum: 870 mg. of crude 3β-(dimethylamino)-14-hydroxy-5β,14β-card-20(22)-enolide. Crystallization from acetone gives prisms of melting point 218°–223°. $\lambda_{max} = 214$ nm.

870 mg. of crude base are dissolved in a little dry chloroform and treated dropwise with chloroform saturated at 20° with dry HCl gas until the solution is just acidic: 835 mg. of colorless needles. Re-solution from methanolether gives 720 mg. of pure 3β-(dimethylamino)-14-hydroxy-5β,14β-card-20(22)- enolide hydrochloride. Melting point 258°–279° (dec.) $\lambda_{max.} = 213$ nm.

200 mg. of 3β-(dimethylamino)-14-hydroxy-5β,14β-card-20(22)-enolide are dissolved in 2 ml. of methanol, treated with 0.4 ml. of CH₃I and allowed to stand at 20° for 14 hours. It is thereupon evaporated in vacuum, whereby there occurs crystallization: 195 mg. of crude product which, after re-solution from methanol-acetone, yields 3β-(trimethylammonium)-14-hydroxy-5β,14β-card-20(22)-enolide iodide in white needles of melting point 251°–254°.

EXAMPLE 23 a. 5 g. of bufalin are dissolved in 150 ml. of acetone, cooled to 0°, treated dropwise, with constant swirling, with 6.5 ml. of Kiliani mixture [J. Polonia et al., Helv. 42, 1437 (1959)] and allowed to stand at 0° for 15 minutes. After the addition of 50 ml. of water and 500 mg. of Na acetate, the mixture is freed from the acetone. The remaining aqueous solution is treated with 5 ml. of 2-N H₂SO₄ and shaken out four times with 50 ml. of chloroform each time. The extracts are washed with water, dried over Na₂SO₄, filtered and evaporated. 4.15 g. of 14-hydroxy-3-oxo-5β,14β-bufa-20(22)-dienolide are obtained in prisms of the double melting point 205°/232°–238° (from acetone).

b. 1 g. of bufalin are dissolved in 4 ml. of pyridine, cooled to 0°, treated with the ice-cold solution of 0.7 g. of tosyl chloride in 2.5 ml. of pyridine and allowed to stand at 0° for 50 hours. Ice is thereupon added, the mixture is held at 20° for 2 hours and taken up with 50 ml. of chloroform-ether (1:3). The organic phase is successively washed with 2-N HCl, water, 1-N soda solution and water, dried over Na₂SO₄, filtered and evaporated. There is obtained 3-0-tosylbufalin of melting point 143°–145°.

c. 500 mg. of 3-0-tosylbufalin are dissolved in 20 ml. of dimethylformamide, treated with 200 mg. of finely powdered NaN₃ and stirred at 20°. The mixture is worked up after 18 hours. There is obtained 3α-azido-14-hydroxy-5β,14β-bufa-20(22)-dienolide, melting point 175°–185°, $\lambda_{max.} = 296$ nm. $[\alpha]_D^{23} = +15°$ 2° (in chloroform).

d. 720 mg. of crude 3α-azido-14-hydroxy-5β,14β-bufa-20(22)-dienolide are dissolved in 250 ml. of methanol-water (9:1) and, after the addition of 300 mg. of 5% Pd/CaCO₃ and 20 drops of triethylamine, hydrogenated for 2 hours under usual conditions. The working up yields 3α-amino-14-hydroxy-5β,14βbufa-20(22)-dienolide hydrochloride $[\alpha]_D^{23} = -6°$ ±2° (in methanol).

EXAMPLE 24

325 mg. of 3α-amino-14-hydroxy-5β,14β-bufa-20(22)dienolide hydrochloride are allowed to stand at 20° in 3 ml. of pyridine and 2 ml. of acetic anhydride for 30 minutes and thereupon freed from the pyridine and acetic anhydride in vacuum with repeated treatment with benzene. From acetone, the residue yields 250 mg. of 3α-acetamido-14-hydroxy-5β,14β-bufa-20(22)-dienolide; flat prisms of melting point 164°–166°; $[\alpha]_D^{23} = +24°$ ±2° (in chloroform).

EXAMPLE 25 a. 4 g. of bufalone [Example 23 paragraph (a)] are dissolved in 100 ml. of dioxan-water (4:1), treated with the solution of 1.5 g. of NaBH₄ in 100 ml. of dioxan-water (4:1) and stirred at 20° for 30 minutes. The mixture is thereupon neutralized with acetic acid, freed from the dioxan in vacuum, the remaining aqueous solution extracted five times with 20 ml. of chloroform each time and this worked up as usual. There are obtained 3.35 g. of 3-epi-bufalin; prismatic needles of the double melting point 257°/260°–272°, (from methanol-ether).

b. 3.25 g. of 3-epi-bufalin are dissolved in 70 ml. of pyridine, cooled to 0°, treated with the ice-cold solution of 2.8 g. of tosyl chloride in 10 ml. of pyridine and allowed to stand at −3°. After 65 hours, the mixture is treated with 100 g. of ice, left at 20° for 2 hours, thereupon taken up with 200 ml. of chloroform-ether (1:4) and washed with 2-N HCl, water, saturated KHCO₃ solution and water, dried over Na₂SO₄ and evaporated. 4.68 g. of 14-hydroxy-3α-tosyloxy-5β,14β-bufa-20(22)-dienolide are obtained as a gelatinous residue.

c. 4 g. of crude 14-hydroxy-3α-tosyloxy-5β,14β-bufa-20(22)-dienolide are dissolved in 120 ml. of dimethylformamide, treated with 3 g. of finely powdered NaN₃ and stirred at 60° for 26 hours. The mixture is thereupon neutralized with acetic acid and 200 ml. of water are added. The precipitated crystals are filtered off and washed with water. The filtrate is exhaustively extracted with chloroform. The dry residue is combined with the crystallisate and chromatographed on 50 g. of SiO₂. There is obtained 3β-azido-14-hydroxy-5β,14β-bufa-20(22)-dienolide of melting point 186°–206°; $[\alpha]_D^{24} = -3°$ ±2° (in chloroform).

d. 800 mg. of 3β-azido-14-hydroxy-5β,14β-bufa-20(22)-dienolide are dissolved in 100 ml. of methanol and 10 ml. of water, treated with 500 mg. of 5% Pd/CaCO₃ and 10 drops of triethylamine and hydrogenated at 20° for 5 hours. The working up yields 550 mg. of crude amine which, with HCl-saturated chloroform, is converted into 3β-amino-14-hydroxy-5β,14β-bufa-20(22)-dienolide hydrochloride $\lambda_{max.} = 296$ nm. $[\alpha]_D^{24} = -12°$ ±2° (in methanol).

EXAMPLE 26

From 3β-amino-14-hydroxy-5β,14β-bufa-20(22)-dienolide, by acetylation by means of acetic anhydride/pyridine there is obtained 3β-acetamido-14-hydroxy-5β,14β-bufa-20(22)-dienolide of melting point 273°–286° (from chloroform-acetone). $[\alpha]_D = +1.5°$ ±2° (in chloroform).

EXAMPLE 27

5 g. of 3β-amino-14-hydroxy-5β,14β-card-20(22)-enolide are dissolved in 40 ml. of ethanol, cooled to −10°, treated with 1.6 ml. of a solution, cooled to −10°, of ethylene oxide in ethanol (500 mg./ml.) and allowed to stand at 20° for 9 hours. An additional 0.4 ml. of the above-mentioned ethylene oxide-ethanol solution are then added and, after a further 24 hours another 0.4 ml. of the ethylene oxide solution. The reaction mixture is then left to stand at 20° for 48 hours and evaporated in vacuo. The residue (foam) is dried at 60° in vacuo until weight constancy, dissolved in 100 ml. of dry chloroform and treated with a solution of hydrogen chloride in chloroform, saturated at 20°, until a slightly acidic (litmus) reaction. The hydrochloride precipitate is filtered off, washed with chloroform and recrystallized from methanol. There is obtained 5.5.6 g. of 3β-[(2-hydroxyethyl)-amino]-14-hydroxy-5β,14β-card-20(22)-enolide hydrochloride, m.p. 294°–298° (decomposition after sintering at 280°). λ max = 216 nm (ε = 15400), $[\alpha]_D^{22} = +19.2° \pm 3°$ (methanol).

120 mg. of the hydrochloride obtained above are dissolved in 5 ml. of water, made alkaline by the addition of 10 per cent NH₃-solution and extracted three times with 10 ml. each of chloroform. The chloroform extracts are washed with water, dried over sodium sulfate and evaporated. The residue is crystallized from chloroform-ether to give 95 mg. of 3β-[(2-hydroxyethyl)-amino]-14-hydroxy-5β,14β-card-20(22)-enolide, m.p. 184°–187° $[\alpha]_D^{20} = +18.3° \pm 2°$ (chloroform).

EXAMPLE 28

By treatment of the compound obtained in accordance with Example 27 with acetic anhydride/pyridine and chromatography of the crude product on SiO₂ with chloroform-ethanol (26:1) there is obtained 3β-[(acetoxyethyl)-acetamido]-14-hydroxy-5β,14β-card-20(22)-enolide of melting point 179°–180° (from acetone-ether). $[\alpha]_D^{20} +14° \pm 2°$ (in chloroform).

EXAMPLE 29

500 mg. of crude 3β-[2-hydroxy-ethyl)-amino]-14-hydroxy-5β,14β-card-20(22)-enolide hydrochloride are dissolved in 40 ml. of dry dioxan and 2 ml. of dry pyridine, cooled to −10°, treated with 1.015 ml. of a solution, cooled to −10°, of COCl₂ in toluene (1 ml. = 575 ml. COCl₂) and allowed to stand at 20° for 30 minutes. After this time, no more starting material is detectable. The mixture is treated with a few drops of ethanol, allowed to stand for a further 30 minutes at 20° and thereupon completely evaporated in vacuum with repeated addition of benzene. The residue is taken up in chloroform-ethanol (4:1) and water and the aqueous phase shaken out with chloroform-ethanol (4:1). The organic phases are washed with water, dried over Na₂SO₄, filtered and evaporated in vacuum. The residue is chromatographed on 90 g. of SiO₂ with chloroform-ethanol (26:1). There is obtained 14-hydroxy-3β-(2-oxo-3-oxazolidinyl)-5β,14β-card-20(22)-enolide of melting point 238°–247°; $[\alpha]_D^{20} = +25° \pm 2°$[in chloroform-methanol (1:1)].

EXAMPLE 30 a. 2.03 g. of uzarigenin are dissolved in 500 ml. of acetone and dehydrogenated analogously to Example 23, section (a). There are obtained 1.5 g. of uzarigenone, prisms of melting point 267°–277°. 1.48 g. of uzarigenone are dissolved with heating in 50 ml. of methanol, treated with the solution of 1.2 g. of hydroxylamine hydrochloride and 1.5 g. of crystalline Na acetate in 7.5 ml. of water and boiled under reflux. After 30 minutes, the mixture is filtered off and the filtrate treated with water. The precipitate is isolated and yields a total of 1.5 g. of crude 14-hydroxy-3-(hydroxyimino)-5α,14β-card-20(22)-enolide. From methanol, crystal leaflets of melting point 296°–303° (dec.).

b. 1.5 g. of 14-hydroxy-3-(hydroxyimino)-5α,14β-card-20(22)-enolide are dissolved hot in 100 ml. of dioxan, 120 ml. of ethanol, 40 ml. of methanol and 45 ml. of water. After cooling to 20°, 30 g. of freshly amalgamated Al turnings 1 g. of NH₄Cl as well as 1.5 ml. of 25% NH₃ solution are added and the mixture is allowed to stand at 20° for 5 days. The working up and separation into neutral and basic portions is effected as described in Example 9. The crude amine is dissolved in 15 ml. of dry chloroform and treated dropwise with chloroform saturated at 0° with dry HCl gas up to the just acidic reaction. In so doing, there separates out 3β-amino-14-hydroxy-5α,14β-card-20(22)-enolide hydrochloride. $[\alpha]_D^{22} = +13° \pm 2°$ (in methanol).

EXAMPLE 31

500 mg. of 3β-amino-14-hydroxy-5α,14β-card-20(22)-enolide hydrochloride are acetylated in 12 ml. of pyridine and 9 ml. of acetic anhydride for 20 hours at 37°, treated with benzene and evaporated to dryness in vacuum. There are obtained 150 mg. of 3β-acetamido—14-hydroxy-5α,14β-card-20(22)-enolide of melting point 285°–292°. $[\alpha]_D^{22} = −29° \pm 2°$ (in pyridine).

EXAMPLE 32

2 g. of freshly prepared 3β-amino-14-hydroxy-5β,14β-card-20(22)-enolide are dissolved in 40 ml. of dry chloroform, cooled to 0°, treated with 20 ml. of ethereal HNCO solution (prepared according to G. Brauer, Hdb. Praep. Anorg. Chemie, F. Enke, Stuttgart 1954, p. 508), [90 mg. HNCO/ml.] of 0° and 7 drops of pyridine and allowed to stand at 0° for 32 hours. The reaction solution is thereupon evaporated in vacuum to about 30 ml. and the residue is shaken out with a little dilute HCl, the HCl extracts being washed with chloroform-ethanol (4:1). The organic phases are washed with 5 ml. of cold saturated aqueous KHCO₃ solution and water, dried over Na₂SO₄, filtered and evaporated in vacuum. There are obtained 1.7 g. of crude product which is chromatographed on 130 g. of SiO₂ with chloroform which contains 7.5% ethanol. The pure 3β-ureido-14-hydroxy-5β,14β-card-20(22)-enolide melts at 255°–262°. $[\alpha]_D^{20} = +53° \pm 2°$ (in methanol).

EXAMPLE 33 a. 2.9 g. of resibufogenone are dissolved in 75 ml. of dioxan-water (4:1), treated with the solution of 1.5 g. of NaBH₄ in 75 ml. of dioxan-water (4:1) and stirred at 20° for 30 minutes. The mixture is thereupon neutralized with glacial acetic and freed from the dioxan in vacuum. The precipitate is filtered off, washed with water and dried at 60°. There are obtained 1.9 g. of 3-epi-resibufogenin of melting point 206°–222° (from acetone).

b. 2.5 g. of 3-epi-resibufogenin are dissolved in 75 ml. of pyridine, cooled to 0° and treated with a solution, likewise cooled to 0°, of 2.1 g. of tosyl chloride in 10 ml. of pyridine and allowed to stand at 3°. After 4 days, the mixture is treated with ice, poured into 200 ml. of chloroform-ether (3:1), the organic phase is washed five times with 50 ml. of dil. HCl each time, once with water, three times with cold saturated KHCO₃ solution and finally with water, dried over Na₂SO₄ and evaporated. After recrystallization from acetic ester-ether, the crude product thus obtained yields 3-0-tosyl-epi-resibufogenin of melting point 131°–136°.

c. 3.1 g. of 3-0-tosyl-3-epi-resibufogenin are treated in 90 ml. of dimethylformamide with 2.3 g. of finely powdered NaN₃ and stirred at 60° for 24 hours. The mixture is thereupon neutralized with glacial acetic and treated with water up to incipient turbidity. The crystallisate is filtered off and washed with water. Chromatography on silica gel yields 3β-azido-14,15-epoxi—5β,14β-bufa-20(22)-dienolide of melting point 226°–229° (from acetone).

d. 2.6 g. of 3β-azido-14,15-epoxi-5β,14β-bufa-20(22)-dienolide are dissolved in 250 ml. of ethanol, treated with 50 drops of triethylamine and 2 g. of 5 per cent Pd/CaCO₃ and shaken in an H₂-atmosphere under normal pressure. After 7 hours, the mixture is filtered off from the catalyst, evaporated in vacuum at 20° (bath-temperature) and the residue taken up in chloroform. The chloroform solution is shaken out five times with 20 ml. of water acidified with HCl each time and finally with 20 ml. of water, dried over Na₂SO₄, filtered and evaporated. There are obtained 1.8 g. of crude product A. The hydrochloric-acidic aqueous phases are made alkaline with ice-cooling with 10 per cent NH₃ solution and shaken out 4 times with 40 ml. of chloroform each time. The chloroform extracts are washed with water, dried over Na₂SO₄ and evaporated at 20° (bath-temperature): 880 mg. of crude 3β-amino-14,15-epoxi—5β,14β-bufa-20(22)-dienolide (crude product B).

e. The crude products A and B obtained as hereinbefore are dissolved in 5 ml. of pyridine and 3 ml. of acetic anhydride and allowed to stand at 20° for 15 minutes. After treatment with water, the mixture is brought to dryness in vacuum with repeated addition of benzene: 2.7 g. of crude product. This is chromatographed on 400 g. of SiO₂ with chloroform. There is obtained 3β-acetamido-14,15-epoxi-5β,14β-bufa-20 (22)-dienolide of melting point 148°–155°; $[\alpha]_D^{24} = +6°\pm2°$ (in chloroform).

EXAMPLE 34 a. 5.8 g. of cinobufagin are dissolved in 125 ml. of dioxan-water (4:1) treated with the solution of 1.75 g. of NaBH₄ in dioxan-water (4:1) and stirred at 20° for 20 minutes. The mixture is thereupon neutralized with glacial acetic and freed from the dioxan in vacuum. The precipitate is extracted three times with chloroform, the extract washed with water, dried over Na₂SO₄, filtered and evaporated in vacuum. The curde product thus obtained is chromatographed on 500 g. of SiO₂ with acetic acid ethyl ester-cyclohexane (1:1). There is obtained 3-epi-cinobufagin of the double melting point 116°–118°/138°–143° (from methanol-ether);$[\alpha]_D^{23} = -2°\pm2°$ (in chloroform).

b. 3.7 g. of 3-epi-cinobufagin are dissolved in 15 ml. of pyridine, cooled to 0°, treated with a solution, cooled to 0°, of 2.5 ml. of tosyl chloride in 9 ml. of pyridine and allowed to stand at 3°. After 39 hours, ice is added, the precipitate is filtered off, washed with dil. HCl and water and taken up in chloroform. The chloroform solution is shaken with dil. HCl and water, dried over Na₂SO₄ and evaporated off. There is obtained 3-0-tosyl-3-epi-cinobufagin of melting point 161°–166° (from chloroform-acetone 1:1).

c. 3.96 g. of 3-0-tosyl-3-epi-cinobufagin are dissolved in 120 ml. of dimethylformamide, treated with 1.6 g. of NaN₃ and stirred at 60° for 40 hours. The mixture is thereupon neutralized with glacial acetic and treated with water up to incipient turbidity. The precipitate is filtered off, washed with water, dried and chromatographed on 280 g. of SiO₂ with acetic acid ethyl ester-cyclohexane (1:4). There is obtained 3β-azido-14,15-epoxi—16β-acetoxy-5β,14β-bufa-20(22)-dienolide of melting point 190°–196°.

d. 2.05 g. of 3β-azido-14,15-epoxi—16β-acetoxy-5β,14β-bufa-20,22-dienolide are dissolved in 250 ml. of ethanol, treated with 50 drops of triethylamine and 1.0 g. of 5 per cent Pd/CaCO₃ and shaken in an H₂-atmosphere under normal pressure. After 3 hours, the mixture is filtered off from the catalyst, evaporated in vacuum at 20° (bath-temperature), the residue comprising 3β-amino-14,15-epoxi—16β-acetoxy-5β,14β-bufa-20(22)-dienolide was taken up in chloroform, then shaken three times with dilute HCl and once with water, dried over Na₂SO₄, filtered and evaported in vacuum. The residue is dissolved in 5 ml. of pyridine and 3 ml. of acetic anhydride and allowed to stand at 20°. After 30 minutes, pyridine and acetic anhydride are removed by repeated addition of benzene and evaporation in vacuum. The residue is chromatographed on 200 g. of SiO₂ with acetic acid ethyl ester-cyclohexane (4:1). There is obtained 3β-acetamido-16β-acetoxy-14,15-epoxi-5β,14β-bufa-20(22)-dienolide of melting point 185°–197°, $[\alpha]_D = 0°\pm2°$ (in chloroform).

EXAMPLE 35

4 g. of 3β-[(2-hydroxyethyl)-amino]-14-hydroxy-5β,14β-card-20(22)-enolide are dissolved in 50 ml. of ethanol. The solution is cooled to −10° and a solution prepared from 2.4 g. of ethylene oxide and 10 ml. of ethanol at −10° is added. The reaction vessel is closed and the mixture allowed to stand at 20°. After 65 and 90 hours, a further 2.4 g. of ethylene oxide dissolved in 10 ml. of ethanol are added to the mixture. After 5 days, the reaction mixture is evaporated in vacuo to yield a foam. The foam is purified by column chromatography on 100 g of SiO₂ (0.05 – 0.20mm) using a mixture consisting of chloroform, ethanol and 25 per cent aqueous ammonium hydroxide solution (99:1:0.4 vol.) as the eluting agent to yield 3.45 g. of pure 3β-[bis-(2-hydroxyethyl)-amino]-14-hydroxy-5β,14β-card-20(22)-enolide of melting point 203°–205° (from chloroform-ether). $[\alpha]_D^{20} = +15.3°\pm2°$ (in chloroform);$\lambda_{max}$ = 216 nm (ε= 17,200) (in ethanol).

8.5 g. of the tertiary amine obtained above is dissolved in 100 – 200 ml dry chloroform. To this solution, a solution of hydrogen chloride in chloroform (saturated at 20°) is added until the reaction mixture becomes slightly acidic (litmus). The hydrochloride which separates out is sucked off, washed with dry chloroform and crystallized from absolute ethanol. There is obtained 5.56 g. of hydrochloride of m.p. 248°–249°, $[\alpha]_D^{22} = +12.9°\pm2°$ (in methanol).

EXAMPLE 36

3.3 g. of 3β-[bis-(2-hydroxyethyl)-amino]-14-hydroxy-5β,14β-card-20(22)-enolide are dissolved in 15 ml of absolute pyridine and 8 ml. of acetic anhydride and left to stand for 15 hours at 20°. Usual workup affords 4 g. of crude diacetyl derivative. The crude product is purified on 50 g. of SiO₂ (0.05 – 0.20 mm) using chloroformethanol (99:1) and recrystallization from acetone-ether to yield 2.4 g. of 3β-[bis-(2-0-acetoxyethyl)-amino]-14-hydroxy-5β,14β-card-20(22)-enolide, m.p. 116°–117°, $[\alpha]_D^{20} = +11.3°\pm3°$ (chloroform).

1 g. of the diacetyl derivative obtained above are dissolved in 30 ml of dry chloroform. A solution of hydrogen chloride in chloroform is added until litmus-acidic reaction. The precipitate is filtered off and washed with dry chloroform and ether. There is obtained 750 mg. of 3β-[bis-(2-0-acetoxyethyl)-amino]-14-hydroxy-5β,14β-card-20(22)-enolide hydrochloride, m.p. 195°–225°, $[\alpha]_D^{22} = +18.6°\pm3°$ (in methanol).

EXAMPLE 37

870 mg. of 3β-[(acetoxyethyl)-acetamido[-14-hydroxy 5β,14β-card-20(22)-enolide (obtained as in Example 28) are dissolved in 70 ml. of methanol. The solution is treated with 5 ml. of 10 per cent ammonium hydroxide solution and left to stand at 20° for 48 hours. The reaction mixture is thereafter evaporated in vacuo and the residue chromatographed on 30 g. of SiO₂ using chloroform-ethanol (19:1). After elution of unpolar material (starting material), a total of 735 mg. of product is eluted. Recrystallization from acetone yields 530 mg. of 3β-[2-hydroxyethyl)-amino]-14-hydroxy-5β,14β-card-20(22)-enolide, m.p. 217°–220°, $[\alpha]_D^{22} =$ + 6° ±2° (chloroform).

I claim:

1. Compounds of the general formula

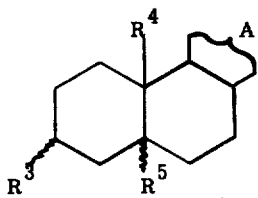

wherein A is selected from a grouping of the formula A₃ or A₄

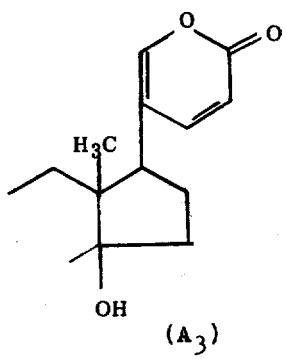 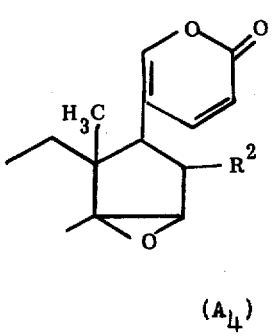

(A₃)  (A₄)

$R^2$ is hydroxy or acetoxy; $R^3$ is a primary, secondary or tertiary amino group or a 2-oxo-3-oxazolidinyl or ureido group; $R^4$ is a methyl group or a beta-hydrogen atom,
and acid addition salts thereof.

2. The compound of claim 1 wherein $R^3$ has the β-configuration.

3. 16β-acetoxy-3β-amino-14-hydroxy-5β,14β-card-20(22)-enolide.

4. 16β-acetoxy-3β-acetamido—14-hydroxy-5β,14β-card-20(22)-enolide.

5. 3β-amino-14,16β-dihydroxy-5β,14β-card-20(22)-enolide.

6. 3β-acetamido-14,16β-dihydroxy-5β,14β-card-20(22)-enolide.

7. 3β-[(2-hydroxyethyl)amino]-14-hydroxy-5β,14β-card-20(22)-enolide.

8. 3β-[(acetoxyethyl)acetamido]—14-hydroxy-5β14β-card-20(22)-enolide.

9. 14-hydroxy-3β-(2-oxo-3-oxazolidinyl)-5β,14β-card-20(22)-enolide.

10. 3β-ureido-14-hydroxy-5β,14β-card-20(22)-enolide.

11. 12β-acetoxy-3β-amino-14-hydroxy-5β,14β-card-20(22)-enolide.

12. 3β-acetamido-12β-acetoxy-14-hydroxy-5β,14β-card-20(22)-enolide.

13. 3β-amino-12β,14-dihydroxy-5β,14β-card-20(22)-enolide.

14. 3β-acetamido-12β,14-dihydroxy-5β,14β-card-20(22)-enolide.

15. The compound of claim 2 wherein A is the group A₃.

16. The compound of claim 15 which is 3β-amino-14-hydroxy-5β,14β-bufa-20(22)-dienolide.

17. The compound of claim 15 which is 3β-acetamido-14-hydroxy-5β,14β-bufa-20(22)-dienolide.

18. The compound of claim 2 wherein A is the group A₄.

19. The compound of claim 18 which is 3β-amino-14,15-epoxi-5β,14β-bufa-20(22)-dienolide.

20. The compound of claim 18 which is 3β-acetamido-14,15-epoxi—5β,14β-bufa-20(22)-dieholide.

21. The compound of claim 18 which is 3β-acetamido-14,15-epoxi—16β-acetoxy-5β,14β-bufa-20(22)-dienolide.

22. 3β-[bis-(2-hydroxyethyl)-amino]-14-hydroxy-5β,14β-card-20(22)-enolide.

23. 3β-[bis-(2-0-acetoxyethyl)-amino]-14-hydroxy-5β,14β-card-20(22)enolide.

24. 3β-[2-(hydroxyethyl)-amino]-14-hydroxy-5β,14β-card-20(22)-enolide.

* * * * *